June 13, 1933. G. R. ECKSTEIN 1,913,436
DEVICE FOR INDICATING PRESENCE OF FOREIGN MATTER IN A LUBRICANT
Filed Oct. 29, 1931
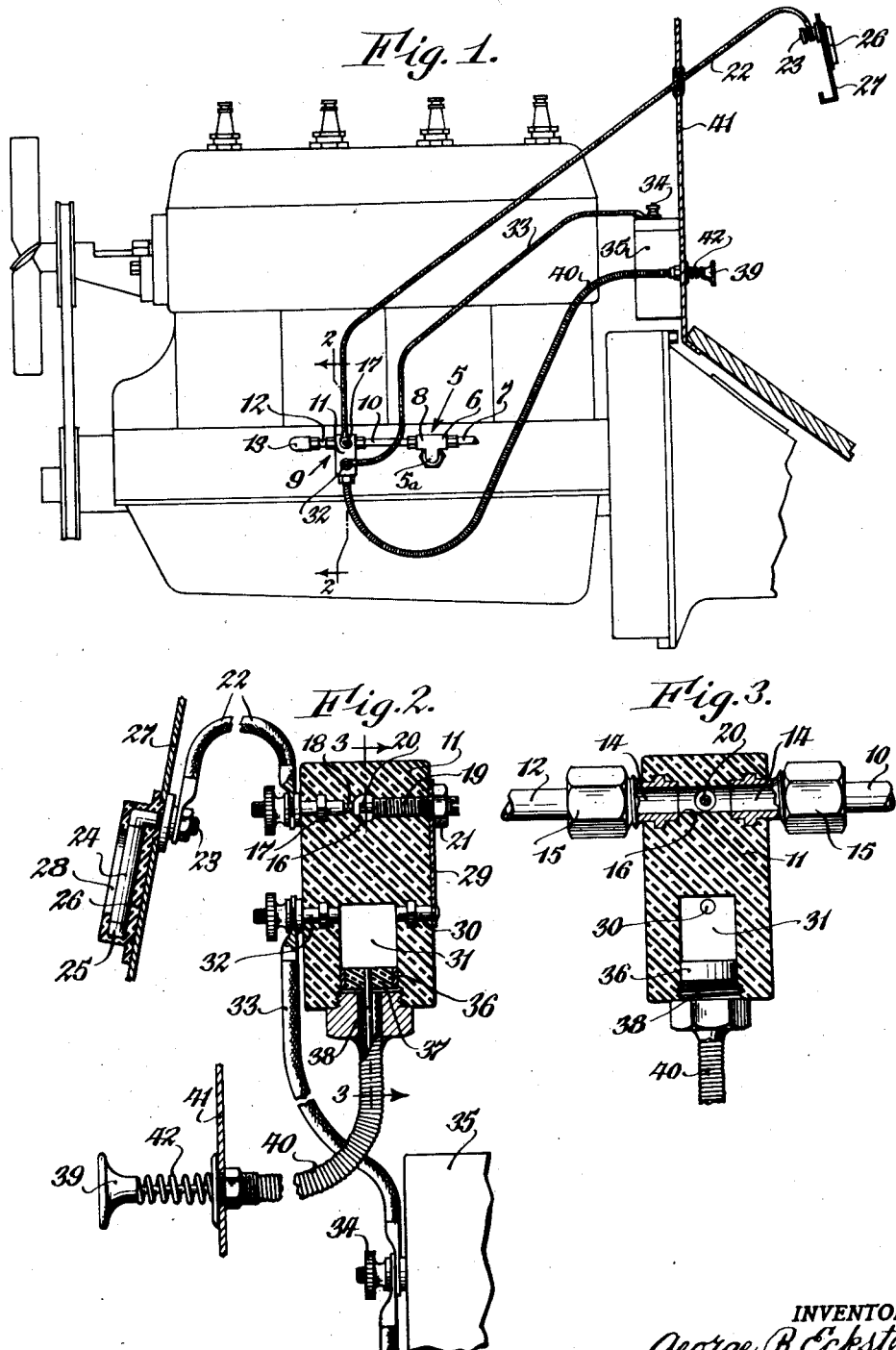
INVENTOR
BY George R. Eckstein
Popp and Powers
ATTORNEYS Patented June 13, 1933

1,913,436

UNITED STATES PATENT OFFICE

GEORGE R. ECKSTEIN, OF BUFFALO, NEW YORK, ASSIGNOR TO VISCO METER CORPORATION, OF BUFFALO, NEW YORK, A CORPORATION OF NEW YORK

DEVICE FOR INDICATING PRESENCE OF FOREIGN MATTER IN A LUBRICANT

Application filed October 29, 1931. Serial No. 571,815.

This invention relates to a device for indicating the presence of foreign substances in a lubricant and more particularly the invention is concerned with a device for use in connection with a system in which the lubricant is caused to circulate.

Such foreign substances may be those which naturally accumulate during the use of the lubricant and which, for example, in the case of the lubricating system of an internal combustion engine may include abrasives such as carbon in granular form, metallic particles of Babbitt metal from bearings and dust. Such substances may also include constituents not accumulated during the use of the lubricant but present in the lubricant prior to its introduction into the system but, however, which also render the lubricant unsuitable for the purpose in view. For example, in the production of lubricants in accordance with certain methods, acids are employed which after having fulfilled their purpose are removed or neutralized. It frequently occurs that in carrying out such processes the entire acid content is not removed or neutralized. The use of the lubricant, therefore, is undesirable by virtue of the reaction which will naturally take place between the acid and those parts of the engine with which the lubricant comes into contact. It is understood, of course, that the rate at which the foreign substances accumulate during the use of the lubricant varies widely in different types of engines as well as by virtue of numerous other factors. It is advantageous, therefore, that there be some means whereby the operator may be informed of the presence of foreign substances in the lubricant whether they be initially present or whether they are accumulated during the use of lubricant in order, on the one hand, to discontinue further use of the lubricant after its deterioration has gone too far and, on the other hand, to avoid too frequent changes with result of waste of lubricant which still may be capable of giving satisfactory service.

The principal object of the present invention is to provide a device which will indicate the existence of a foreign substance content in the lubricant, whether it be that which has naturally accumulated during the use of the lubricant or otherwise, of such a percentage as to render the lubricant unsuitable for further use.

A further object is to provide a device which is capable of indicating the presence of foreign substances in the lubricant even though the foreign substance content is not great enough to necessitate modification or replacement of the lubricant, whereby the operator may be informed not only of the condition of the lubricant at a stage when its modification or replacement is required but also of its condition at intermediate stages.

A still further object is to provide a device which is adaptable to meet the requirements of various installations.

Devices of the type described are particularly adapted for, although not necessarily limited to, use in connection with the lubricating system of an internal combustion engine and such use of the invention is herein shown and described by way of example.

The invention is illustrated in the accompanying drawing, in which:—

Figure 1 is a side elevation of an automobile engine equipped with the device in which the features of the invention are incorporated.

Figure 2 is a section taken along line 2—2 of Figure 1.

Figure 3 is a section taken along line 3—3 of Figure 2.

In connection with automobile engines, it is the practice to utilize a gauge for indicating the pressure of the lubricant in the lubricating system and for this purpose the latter includes a fitting by which the gauge may be connected in the system, the fitting being secured for convenience upon an outer wall of the engine.

When employed in connection with such a system, the device may be conveniently included in the system through the same medium as the pressure gauge, that is to say, by the pressure gauge fitting, although the connection may be made otherwise if desired. The fitting 5, as illustrated, in Figure 1, is preferably of a standard T construction, its central leg 5a being suitably connected to the piping of the lubricating system. The arrangement of the piping is not material and hence is not illustrated. One arm 6 of the fitting is designed for connection with the usual pressure gauge (not shown) through a pipe 7 while the other arm 8 is availed of for the connection of the indicating device 9 in the lubricating system. The arm 8 of the fitting, therefore, is connected to the device 9 by a pipe 10.

The device 9, as illustrated, comprises a body 11 preferably of insulating material which may be supported from the wall of the engine by pipes 10 and 12, the latter being connected to an elbow fitting 13 carried by the wall of the engine. The body 11 carries oppositely disposed tubular elements 14, the inner ends of which are embedded in the body 11 and the outer ends of which are suitably threaded to permit connection of the pipes 10 and 12 thereto by couplings 15. The body 11 is formed with a chamber 16 which is in communication with the elements 14, the latter forming a continuation of the former. In other words, the chamber 16 provides a connecting passage between the pipes 10 and 12 through which the lubricant is caused to circulate. An electrode 17 is embedded in the body 11 and the inner end 18 of the electrode extends into the chamber 16. At the opposite side of the body 11, there is a second electrode 19, the inner end 20 of which also extends into the said chamber. The body of the electrode 19 is suitably threaded whereby it may be adjusted so that the space between the inner ends 18 and 20 of the electrodes may be varied as circumstances may require. The electrode 19 is provided with a locking nut 21 by which it may be locked in the position to which it is adjusted.

The electrode 17 is connected by a wire 22 to a lateral extension 23 of one electrode of an electroluminescent tube 24. The latter is provided at its opposite end with a suitable electrode 25. As illustrated, the electroluminescent tube 24 is embedded in an insulating block 26 which is secured to the instrument panel 27 of the vehicle and formed with a slot 28 through which the body portion of the tube is exposed. The electrode 19 is connected by a conductor strip 29 to a contact 30 which is carried by the body 11. The contact 30 extends into a chamber 31 formed in the body 11. Opposite the contact 30 and also extending into the chamber 11 is a second contact 32. The latter is connected by a wire 33 to the power terminal 34 of the ignition coil 35 of the engine, the said coil, as customary, consisting of a conventional induction coil. The contacts 30 and 32 may be connected by a connector ring 36 which is carried upon a plunger 37, which ring may be moved back and forth in the chamber 11 to connect and disconnect the contacts 30 and 32. Such movements of the ring are effected by a wire 38 which is suitably connected to the plunger 37 at its inner end and which carries a knob 39 at its outer end. The wire 38 is encased within a flexible cable 40, one end of which is suitably secured to the body 11 and the other end of which is suitably secured to the cowl panel 41 of the automobile. The plunger 37 is normally held in the bottom of the chamber 31 by a spring 42 which is carried upon the wire 38 and which acts against the knob 39 and the cowl panel 41 to maintain the plunger in this position in which the contacts 30 and 32 are disconnected. It will be apparent that the said contacts are normally disconnected but may be connected by operating the knob 39 against the action of the spring 42, the latter serving after the release of the button 39 to return the plunger to the lower part of the cylinder 31, and hence disconnect the said contacts. The knob 39 is preferably arranged in a position where it may be conveniently operated by the foot of the operator of the vehicle. From the foregoing, it will be apparent that upon operation of the knob 39 the electroluminescent tube 24 is connected to the power terminal of the ignition coil 35.

It is the practice to cause the lubricant in the lubricating system to circulate under a pressure high enough to force the lubricant to all surfaces requiring lubrication, this being accomplished by a suitable pump. The device 9 being connected in the lubricating system, it follows that lubricant is supplied to, and causes to flow through, the chamber 16 and hence between the terminal portions 18 and 20 of the two electrodes.

Lubricating oil, when uncontaminated is an extremely poor conductor of electricity even where high tension current is employed. Hence, upon operation of the knob 39 to connect the contacts 30 and 32 in the ignition circuit, there being no foreign substances contained in the lubricant, the electroluminescent tube, therefore, will remain unenergized. However, during the operation of the engine, assuming the lubricant contains no undesirable constituents at the outset, there will be a gradual accumulation of foreign substances such as, for example, carbon in granular form, metallic particles, dust and other undesirable constituents, all of which have a considerably higher conductivity than the lubricant in its uncontaminated state. These various constituents become a part of the circulating body of liquid and hence pass through the chamber 16 between the electrodes. The latter are adjusted so that upon passage of such a particle between them the resistance of the gap between the electrodes is substantially reduced and hence a circuit is established to the electroluminescent tube 24. In other words, the electrodes are so spaced that current passes between them only when a particle of foreign matter is present in the gap provided by the electrodes. As a particle of foreign matter passes through the said gap the resistance of the gap is so reduced that the current jumps, in the form of a spark, between the electrodes, thereby causing the tube 24 to flash. The latter in response to the high tension current from the ignition coil is, therefore, energized and the glow thereof is visible through the slot 28. As the particle passes from between the electrodes, the circuit to the electroluminescent tube will be broken and hence the latter will be de-energized. It is to be noted that the electrode 25 of the electroluminescent tube is not grounded. Hence, the gaseous medium with which the tube is filled is caused to glow by what is in effect a static electricity. If desired, however, the electrode 25 may be grounded. Thus, the tube will flash on and off as particles pass between the electrodes, the rapidity of the flashes depending upon the proportion of foreign substances present. The gap between the electrodes is preferably adjusted so that as the proportion of foreign substances approaches a value such that continued use of the lubricant would result in possible injury to the bearing surfaces of the engine, the tube will glow constantly. The operator is thereby advised that the lubricant should be modified or changed. From the foregoing, it will be noted that the electroluminescent tube 24 indicates the presence of foreign substances in the lubricant regardless of the proportion of such substances. Hence, if the electroluminescent tube 24 flashes intermittently upon operation of the knob 39 the operator is advised that modification or change of the lubricant is not required at the time. The rapidity of the flashes, however, serves to indicate in a general way the proportions of foreign substances present. As best shown in Figure 2, the cooperating ends of the electrodes are of a relatively small area. By virtue of this construction an accurate indication of the number of particles passing between the electrodes, and hence the amount of said foreign matter present, can be obtained.

Lubricating oil is such a poor conductor of electricity that even when contaminated with foreign substances, it is essential that the current which is employed to indicate the presence of such substances be of a relatively high voltage. When the device is employed in connection with the lubricating system of an internal combustion engine, current of the necessary voltage may, therefore, be conveniently obtained from the ignition coil of the ignition system. The current thus obtained is also suitable for use in connection with the electroluminescent tube which is employed as such tubes also require a relatively high voltage to ionize the gaseous medium with which they are filled.

In addition to the above uses, the device is also available to indicate the existence of any acids which may be present as a result of improper refining operations. Any unneutralized acids are objectionable since they react with those parts of the engine with which the lubricant comes into contact. As the acids which are employed in refining operations impart a high conductivity to the lubricant, they may be readily detected by the device. It will be apparent, therefore, that the device has the advantage that in addition to its use to indicate the presence of foreign substances which normally accumulate during the use of the lubricant it also may be used to advantage in selecting a lubricant having characteristics most suitable for the system in which the device is connected.

I claim as my invention:

1. Apparatus for testing a finished lubricating oil to determine the presence of foreign matter which may accumulate in the oil as a result of its use and which tends to impair the lubricating quality of the oil, including spaced electrodes between which the oil is caused to pass in a flowing stream, a source of power, a luminescent tube and circuit means whereby said luminescent tube is energized in response to said source of power as particles of such foreign matter pass between said electrodes.

2. Apparatus for testing lubricating oil to determine the presence of foreign matter which may accumulate in the oil as a result of its use and which tends to impair the lubricating quality of the oil, including spaced electrodes between which the oil is caused to pass in a flowing stream, a source of power, an electrical indicator and circuit means whereby as a particle of such foreign matter passes between said electrodes current from said source is caused to pass between the electrodes in the form of a spark and close said circuit means to energize said indicator.

3. Apparatus for testing lubricating oil to determine the presence of foreign matter which may accumulate in the oil as a result of its use and which tends to impair the lubricating quality of the oil, including spaced electrodes between which the oil is caused to pass in a flowing stream, a source of power, a luminescent tube and circuit means whereby as a particle of such foreign matter passes between said electrodes current is caused to pass between the electrodes in the form of a spark and close said circuit means to energize said tube.

4. Apparatus for testing lubricating oil to determine the presence of foreign matter which may accumulate in the oil as a result of its use and which tends to impair the lubricating quality of the oil, including spaced electrodes between which the oil is caused to pass in a flowing stream, a source of power, an electrical indicator and circuit means whereby said indicator is responsive to said source of power as particles of such foreign matter pass between said electrodes, said electrodes being of such an area as to be substantially non-capacitive.

5. Apparatus for testing lubricating oil to determine the presence of foreign matter which may accumulate in the oil as a result of its use and which tends to impair the lubricating quality of the oil, including spaced electrodes between which the oil is caused to pass in a flowing stream, a source of power, a luminescent tube and circuit means whereby said luminescent tube is energized in response to said source of power as particles of such foreign matter pass between said electrodes, said electrodes being of such area as to be substantially non-capacitive.

6. Apparatus for testing lubricating oil to determine the presence of foreign matter which may accumulate in the oil as a result of its use and which tends to impair the lubricating quality of the oil, including spaced electrodes between which the oil is caused to pass in a flowing stream, a source of power, an electrical indicator and circuit means including an induction coil, whereby as a particle of such foreign matter passes between said electrodes current from said source is caused to pass between the electrodes in the form of a spark and close said circuit means to energize said indicator.

7. Apparatus for testing lubricating oil to determine the presence of foreign matter which may accumulate in the oil as a result of its use and which tends to impair the lubricating quality of the oil, including spaced electrodes between which the oil is caused to pass in a flowing stream, a source of power, a luminescent tube and circuit means including an induction coil, whereby as a particle of such foreign matter passes between said electrodes, current from said induction coil is caused to pass between the electrodes in the form of a spark and close said circuit to energize said tube.

8. The combination with the lubricating and ignition systems of an internal combustion engine, of a device for indicating the presence of foreign matter in the lubricant in the lubricating system, said device including a chamber which communicates with said lubricating system, spaced electrodes in said chamber between which the lubricant is caused to pass in a flowing stream, an indicator and circuit means including the ignition coil of said ignition system, whereby said indicator is responsive to current from said ignition coil as particles of foreign matter pass between said electrodes.

9. The combination with the lubricating and ignition systems of an internal combustion engine, of a device for indicating the presence of foreign matter in the lubricant in the lubricating system, said device including a chamber which communicates with said lubricating system, spaced electrodes in said chamber between which the lubricant is caused to pass in a flowing stream, a luminescent tube and circuit means including the ignition coil of said ignition system, whereby said tube is energized by current from said ignition coil as particles of foreign matter pass between said electrodes.

10. A device for indicating the presence of foreign matter in the lubricant in a lubricating system including a body, a chamber in said body through which lubricant is caused to flow, spaced electrodes in said chamber between which the lubricant passes, an electroluminescent tube, one of said electrodes being connected to a terminal of said tube and means for connecting the other of said electrodes to a source of power, whereby upon passage of a particle of foreign matter between said electrodes said electroluminescent tube is caused to glow, said means including a pair of spaced contacts carried by said body, an insulating element mounted in said body, a ring carried by said element and means for moving said element so that said contacts are connected by said ring.

In testimony whereof I affix my signature.

GEORGE R. ECKSTEIN.